(12) United States Patent
Larsson et al.

(10) Patent No.: US 8,611,943 B2
(45) Date of Patent: Dec. 17, 2013

(54) POWER CONTROL IN A RADIO COMMUNICATION SYSTEM WITH MULTIPLE TRANSPORT FORMATS

(75) Inventors: Kjell Larsson, Lulea (SE); Peter Okvist, Lulea (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 895 days.

(21) Appl. No.: 12/741,627

(22) PCT Filed: Nov. 9, 2007

(86) PCT No.: PCT/SE2007/050832
§ 371 (c)(1),
(2), (4) Date: May 6, 2010

(87) PCT Pub. No.: WO2009/061245
PCT Pub. Date: May 14, 2009

(65) Prior Publication Data
US 2010/0234041 A1    Sep. 16, 2010

(51) Int. Cl.
*H04W 52/24*    (2009.01)

(52) U.S. Cl.
USPC ....... 455/522; 455/69; 455/67.11; 455/552.1; 370/252

(58) Field of Classification Search
USPC .............. 455/522, 69, 67.11, 552.1; 370/311, 370/325, 352
See application file for complete search history.

(56) References Cited

U.S. PATENT DOCUMENTS

| | | | |
|---|---|---|---|
| 2002/0003785 A1 | 1/2002 | Agin | |
| 2004/0233899 A1* | 11/2004 | Vayanos et al. | 370/352 |
| 2005/0026642 A1* | 2/2005 | Lee et al. | 455/522 |
| 2005/0059400 A1* | 3/2005 | Jagadeesan et al. | 455/436 |
| 2005/0141560 A1* | 6/2005 | Muthiah | 370/474 |
| 2006/0062193 A1* | 3/2006 | Choi et al. | 370/342 |
| 2006/0293075 A1* | 12/2006 | Kansakoski et al. | 455/522 |
| 2007/0036114 A1* | 2/2007 | Zhang | 370/335 |
| 2007/0060189 A1 | 3/2007 | Vallette et al. | |
| 2007/0207811 A1* | 9/2007 | Das et al. | 455/450 |
| 2010/0165854 A1* | 7/2010 | Harada et al. | 370/252 |
| 2010/0284278 A1* | 11/2010 | Alanara | 370/235 |

FOREIGN PATENT DOCUMENTS

EP    1061668 A1    12/2000

\* cited by examiner

*Primary Examiner* — Lester Kincaid
*Assistant Examiner* — Dung Lam
(74) *Attorney, Agent, or Firm* — Rothwell, Figg, Ernst & Manbeck, P.C.

(57) ABSTRACT

A method, an apparatus and a computer program for controlling updating of a signal quality target (405) for power control of an ongoing radio transmission (101) in a radio communication system (SYS1), wherein the signal quality target is updated based on communication quality. The method includes detecting (301) a change in transmission format from a first transmission format to a second transmission format for the radio transmission. Any updates causing the signal quality target to increase due to communication quality being below a set communication quality target are blocked (302) for a predefined blocking period after detecting said change in transmission format.

18 Claims, 3 Drawing Sheets

POWER CONTROL IN A RADIO COMMUNICATION SYSTEM WITH MULTIPLE TRANSPORT FORMATS

CROSS-REFERENCE TO RELATED APPLICATION

This application is a 35 U.S.C. §371 National Phase Application from PCT/SE2007/050832, filed Nov. 9, 2007, and designating the United States.

TECHNICAL FIELD

The present invention relates to method and arrangements in a radio communication system. The invention more in particular relates to power control of radio transmissions in the radio communication system.

BACKGROUND

In cellular radio communication systems radio transmission are typically subject to power control. Thus in e.g. cellular radio communication systems conforming to the $3^{rd}$ Generation Partnership Project (3GPP) Universal Mobile Telecommunications (UMTS) specifications, power control of radio transmissions are performed utilizing both inner and outer-loop power control functions.

The inner-loop power control (ILPC) adjusts the transmit power of a sending entity towards a specific signal quality target, e.g. signal-to-interference ratio (SIR) target, at a receiving entity, whereas the outer-loop power control (OLPC) adjusts the signal quality target of the inner loop power control in order to maintain a specified communication quality-based target (e.g. Block Error Rate (BLER) or number of transmission attempts). In the uplink direction, i.e. from mobile station to base station, OLPC is used both in connection with DCH (Dedicated Channel) and E-DCH (Enhanced Data Channel) transport channels, but typically in a slightly different manner. Due to the use of HARQ (Hybrid Automatic Repeat Request) protocol in EUL (Enhanced Uplink), i.e. when communicating using an E-DCH transport channel, the OLPC quality target is typically the number of transmission attempts while for communications using a DCH transport channel, the OLPC quality target is typically Block Error Rate (BLER).

The transmission format, the so called E-DCH Transport Format Combination (E-TFC), used in each Transmission Time Interval (TTI) can be varied between TTIs so as to adapt the amount of data transmitted to the currently available resources and/or the amount of data available for transmission.

SUMMARY

The problem dealt with by the present invention is enabling improved power control of radio transmissions in a radio communication system.

In one aspect, the present invention is a method of controlling updating of a signal quality target for power control of an ongoing radio transmission in a radio communication system, wherein the signal quality target is updated based on communication quality so that the signal quality target is increased when encountering events indicating that the communication quality is below a communication quality target and the signal quality target is reduced when encountering events indicating that the communication quality is above the communication quality target. The method includes detecting a change in transmission format from a first transmission format to a second transmission format for the radio transmission. Any updates causing the signal quality target to increase due to the communication quality being below the communication quality target are blocked for a predefined blocking period after detecting said change in transmission format.

In another aspect, the present invention is an apparatus adapted to control updating of a signal quality target for power control of a radio transmission in a radio communication system. The apparatus is adapted to update the signal quality target based on communication quality so that the signal quality target is increased when encountering events indicating that the communication quality is below a communication quality target and the signal quality target is reduced when encountering events indicating that the communication quality is above the communication quality target. The apparatus includes detecting means for detecting a change in transmission format from a first transmission format to a second transmission format for the radio transmission. The apparatus further includes blocking means for blocking, for a predefined blocking period after detecting said change in transmission format, any updates causing the signal quality target to increase due to communication quality being below the communication quality target.

In yet another aspect, the present invention is a computer program embodied on a computer-readable medium and executable by digital data processing circuitry to perform the method recited above.

A general advantage afforded by the invention is that it enables improved power control of radio transmissions by providing lower and more stable signal quality targets.

The invention will now be described in more detail with reference to exemplary embodiments thereof and also with reference to the accompanying drawings.

DETAILED DESCRIPTION

Figure 1:
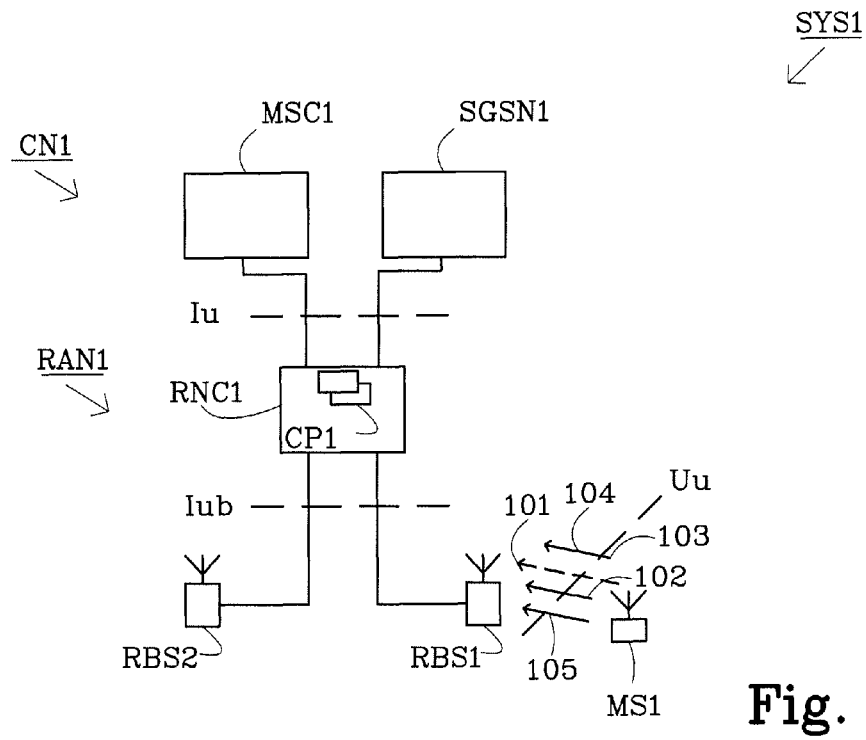
FIG. 1 is a schematic view of a non-limiting example of a radio communication system in which the present invention may be implemented.

FIG. 1 illustrates a non-limiting example of a communication system SYS1 in which the present invention may be employed. The exemplary communication system SYS1 illustrated in FIG. 1 is a Universal Mobile Telecommunication System (UMTS). The communication system SYS1 includes a core network CN1, a UMTS Terrestrial Radio Access Network (UTRAN) RAN1 and User Equipment (UE), alternatively referred to as mobile stations (MS).

The core network CN1 includes a Mobile services Switching Center (MSC) node MSC1 that provides circuit-switched services and a General Packet Radio Service (GPRS) node SGSN1, sometimes referred to as a Serving GPRS Support node (SGSN), which is tailored to provide packet-switched type services. Each of the core network nodes MSC1 and SGSN1 connects to the the radio access network RAM over a radio access network interface referred to as the Iu interface. The radio access network RAN1 includes one or more radio network controllers (RNCs). For sake of simplicity, the radio access network RAN1 of FIG. 1 is shown with only one radio network controller node RNC1. Each radio network controller is connected to and controls a plurality of radio base stations (RBSs). For example, and again for sake of simplicity, FIG. 1 only illustrates a first radio base station node RBS1 and a second radio base station node RBS2 connected to the radio network controller node RNC1. The interface between the radio network controller RNC1 and the base stations RBS1 and RBS2 is referred to as the Iub interface. Mobile stations, such as mobile station MS1 shown in FIG. 1, communicate with one or more radio base stations RBS1-RBS2 over a radio or air interface referred to as the Uu interface. Each of the radio interface Uu, the Iu interface and the Iub interface are shown by dashed lines in FIG. 1

Figure 2:
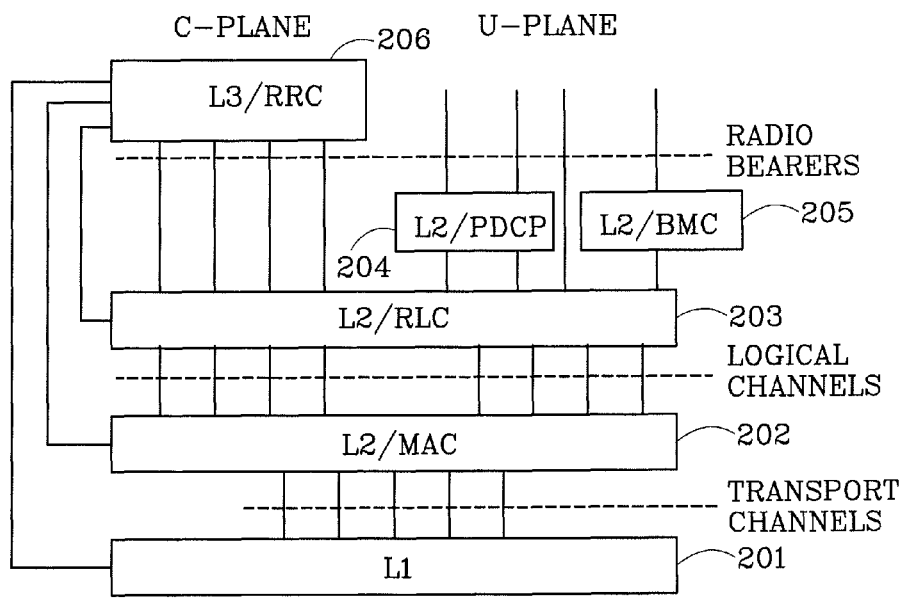
FIG. 2 is a block diagram providing a simplified illustration of the radio interface architecture of the communication system in FIG. 1.

FIG. 2 is a simplified illustration of the radio interface architecture of the UMTS system illustrated in FIG. 1. The radio interface is layered into three protocol layers:

the physical layer, also referred to as Layer 1 (L1)
the data link layer, also referred to as Layer 2 (L2)
the network layer, also referred to as Layer 3 (L3).

Layer 2 is split into a number of sublayers including Medium Access Control (MAC) 202, Radio Link Control (RLC) 203, Packet Data Convergence Protocol (PDCP) 204 and Broadcast/Multicast Control (BMC) 205.

Layer 3 and the RLC-sublayer are further divided into a Control-plane (C-plane) and a User-plane (U-plane) while the PDCP- and BMC-sublayers exist in the U-Plane only. The U-plane protocols implements so called radio access bearer services, i.e. services for carrying user data (e.g. speech, data or multimedia) between mobile stations and the core network. The C-plane provides a Radio Resource Control (RRC) protocol for controlling the radio access bearers and the connection between mobile stations and the network from different aspects.

The physical layer 201 offers information transfer services to the MAC-layer and higher layers. The physical layer transport services are described by how and with what characteristics data are transferred over the radio interface. These services are denoted Transport Channels. The physical layer 201 is responsible for mapping the transport channels onto physical channels of the radio interface Uu. The physical layer 201 performs functions including FEC encoding/decoding and interleaving/deinterleaving of transport channels, multiplexing/demultiplexing of transport channels, rate matching, modulation/demodulation and spreading/despreading of physical channels, closed-loop power control and RF-processing.

The MAC-sublayer 202 provides data transfer services on logical channels. A set of logical channel types is defined for different kinds of data transfer services offered by the MAC-sublayer. Each logical channel type is defined by what type of information is transferred. The MAC-sublayer 202 performs functions including mapping between logical channels and transport channels, selection of appropriate transport format for each transport channel depending on instantaneous source rate, transport channel type switching and ciphering.

The RLC-sublayer 203 provides different data transfer services to higher layers including transparent, unacknowledged and acknowledged data transfer. The RLC-sublayer 203 performs functions including segmentation and reassembly of higher layer protocol data units, concatenation, ciphering, error correction and flow control.

The PDCP-sublayer 204 provides transfer of user data and header compression/decompression.

The BMC-sublayer 205 provides a broadcast/multicast transmission service in the user plane for common user data in unacknowledged mode.

The UMTS system illustrated in FIG. 1 supports the new transport channel Enhanced Dedicated Channel (E-DCH) in the uplink direction (i.e. for transmissions from mobile stations such as mobile station MS1 to the radio access network RAN1) which was introduced in 3GPP Release 6. This Enhanced uplink, also known as HSUPA (High Speed Uplink Packet), provides higher throughput, reduced latency and increased capacity.

There is at most one E-DCH transport channel per E-DCH capable mobile station e.g. mobile station MS1 and the E-DCH transport channel is mapped onto a set (one or more) of E-DCH Dedicated Physical Data Channels (E-DPDCHs). Each E-DCH transport channel is further supported by a E-DCH Dedicated Physical Control Channel (E-DPCCH) providing information in the uplink direction to the network for enabling a radio base station e.g. the first radio base station RBS1 to demodulate and decode the data transmission. FIG. 1 schematically illustrates an example scenario of an E-DCH transport channel 101 established for uplink transmissions from the mobile station MS1 to the first radio base station RBS1. The E-DCH transport channel 101 is mapped onto an E-DPDCH channel 102 and supported by an E-DPCCH channel 103.

The transmission format, the so called E-DCH Transport Format Combination (E-TFC) used in each Time Transmission Interval (TTI) can be varied between TTIs so as to adapt the amount of data transmitted to the currently available resources and/or the amount of data available for transmission. In each TTI, at most one transport block of dynamic size is transmitted on an E-DCH transport channel. The E-DCH Transport Format Combination of a TTI defines the size of the transport block but also implicitly a lot of other aspects of the transmission format of the E-DCH transport channel in the TTI such as e.g. the number of E-DPDCHs and their spreading factors, amount of padding/truncation etc.

The set of possible E-DCH Transport Format Combinations are predefined in the 3GPP specifications and are provided in the 3GPP TS 25.321 specifications (release 6) as four different tables. For each of the two TTIs specified (2 ms and 10 ms), there is one table optimized for common RLC Protocol Data Unit sizes and one general table with constant maximum relative overhead. Which table to use is defined by the applicable TTI and Radio Resource Control signaling between the network and a mobile station.

When data transmissions are ongoing on the E-DCH Transport Channel 101, the E-DCH Transport Format Combination used in the current TTI is indicated from the mobile station MS1 to the first base station RBS1 as an E-DCH Transport Format Indicator (E-TFCI) (schematically indicated as 104 in FIG. 1). The E-TFCI indicates which entry in the applicable E-Transport Format Combination table that defines the current E-Transport Format Combination. Thus, based on the E-TFCI value the first radio base station RBS1 receives for a TTI, it knows how to demodulate and decode the E-DCH data transmission from the mobile station MS1 in that TTI.

The E-DCH power control works in a similar manner as for the so called Dedicated (DCH) transport channel.

The E-DPDCH transmission power is defined relative to the uplink Dedicated Physical Control Channel (DPCCH) (schematically illustrated as 105 in FIG. 1). Each E-DCH Transport Format Combination has an associated E-DPDCCH-to-DPCCH gain factor $\beta_{ed}$ defining the relationship between the E-DPDCH and uplink DPCCH transmission powers. The mobile station MS1 is informed of the gain factors associated with the respective E-DCH Transport Format Combination via reference gain factors $\beta_{ed.ref}$ associated with respective reference E-DCH Transport Format Combinations and signaled from the radio access network RAN1. Typically, the number of reference E-DCH Transport Format Combinations/reference gain factors $\beta_{ed.ref}$ pairs are much less (e.g. less than 10) than the total number of E-DCH Transport Format Combinations (up to 128) the mobile station MS1 may use. For other E-DCH Transport Format Combinations the mobile station MS1 derives gain factors by interpolating from the signaled reference gain factors provided.

The E-DCH power control further utilizes both an inner loop power control (ILPC) function and an outer loop power control (OLPC) function.

For the example scenario of FIG. 1 wherein the E-DCH Transport Channel 101 has been established between the mobile station MS1 and the first radio base station RBS1, power control would typically be performed as follows.

The first radio base station RBS1 performs inner loop power control by estimating a received Signal-to-Interference ratio (SIR) of the Dedicated Physical Control Channel 105 and comparing it to a signal quality target value in the form of a target SIR. Based on the result, the first radio base station RBS1 issues transmit power control (TPC) commands to the mobile station MS1 ordering it to increase or decrease its transmission power depending on whether the estimated SIR was below or above the target SIR.

The target SIR is provided by the outer loop power control function performed by the radio network controller RNC1. Communication quality, for E-DCH transport channels typically defined as a certain targeted number of transmission attempts in an Hybrid ARQ (HARQ) process associated with the E-DCH transport channel, is evaluated. If the communication quality is too low, i.e. the number of transmission attempts are above the set target, the target SIR is increased while if the communication quality is too high, i.e. the number of transmission attempts are below the set target, the target SIR is decreased. Changes in the target SIR is communicated from the radio network controller to the first radio base station RBS1.

The target SIR may e.g. be established for each successfully received so called MAC-es Protocol Data Unit (PDU) as $$SIR_{target}(k+1)=SIR_{target}(k)+(N_{ERR}-TTE_{target})*SIR_{step}/(1-TTE_{target}) \quad (1)$$

where $SIR_{target}$ is the current SIR target;

k is an index representing time;

$SIR_{step}$ represents the step size when increasing the $SIR_{target}$ e.g. 0.5-1 dB.

$TTE_{target}$ is the wanted Transmission Attempts (TA) target error rate characterizing the quality requirement the OLPC function strives to fulfill.

$N_{err}$ is equal to one if too many Transmission Attempts were required in order to decode the block, and zero otherwise.

The inventors of the present invention have recognized that as a result of using relatively few reference E-DCH Transport Format Combinations/reference gain factors $\beta_{ed.ref}$ pairs (as compared to the total number of E-DCH Transport Format Combinations), at least some of the remaining E-DCH Transport Formats will get suboptimal gain factors. These suboptimal gain factors cause different E-DCH Transport Format Combinations to require different SIR target values to fulfill the targeted communication quality (e.g. number of transmission attempts).

The spread in different required SIR targets due to suboptimal gain factors can be several dB and exhibits a "wrap around pattern" according to which for increasing E-TFCI values, i.e. for E-DCH Transport Format Combinations associated with increasing transport block sizes, the required SIR target values often increases between two neighboring E-DCH Transport Format Combinations but sometimes also decreases significantly.

As a consequence of these suboptimal gain factors, the OLPC function need not only compensate for the effect of a changing radio environment (which results in varying SIR-target), but also different required SIR-targets for different E-DCH Transport Format.

Since the OLPC is a rather slow control mechanism, it takes time for the OLPC to find the right SIR-target when there is a change in transmission format from a first E-DCH Transport Format Combination to a second E-DCH Transport Format Combination requiring a different SIR-target than the first E-DCH Transport Format Combination. During this time unnecessary retransmissions that costs user throughput might occur since the signal quality is not good enough or alternatively, the signal quality is too high causing unnecessary interference and hence wasting system capacity.

In unfavorable cases, an E-DCH Transport Format Combination providing smaller transport blocks (i.e. less number of bits in each transport block/TTI) that requires significantly higher SIR-target than the normally used E-DCH Transport Format Combination might be selected now and again for short periods of time. Since this E-DCH Transport Format, despite the lower number of bits in each transport block, requires a higher SIR target, it is likely that a transmission target error occur which triggers an OLPC up-step to increase the SIR-target when changing to this E-DCH Transport Format Combination from the normally used E-DCH Transport Format Combination. If the transmission format then shortly there after is changed back to the normal E-DCH Transport Format Combination, it still takes a rather long time for the OLPC to reduce the target SIR back down to the level appropriate for the normally used E-DCH Transport Format Combination and during this time, the SIR target level used is too high and thus system capacity is wasted.

The repeated use of the E-DCH Transport Format Combination requiring a higher SIR target for short periods of time may in worst case scenarios, result in too high SIR-target being applied for most of the duration of a communication session.

Figure 3:
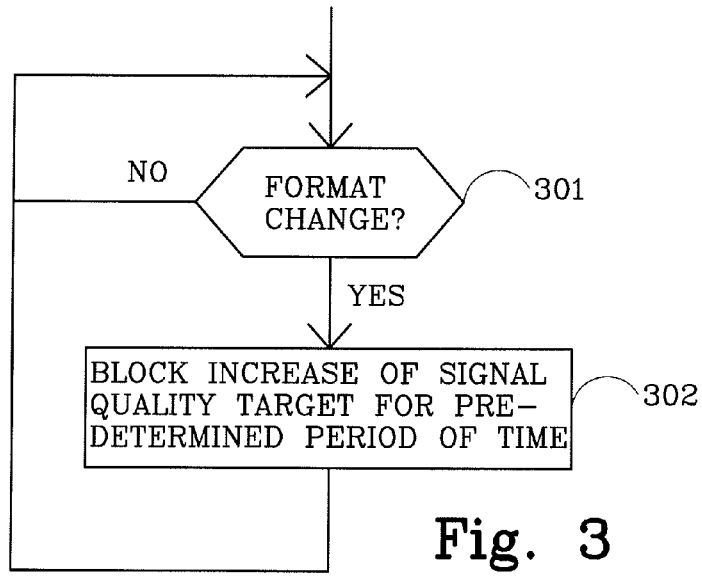
FIG. 3 is a flow diagram illustrating a first exemplary embodiment of a method according to the invention.
Figure 4:
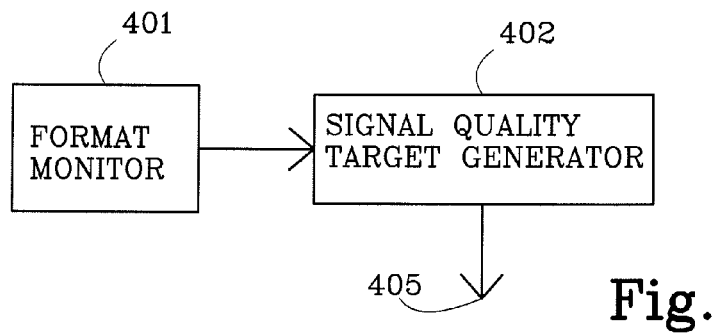
FIG. 4 is a block diagram illustrating a first exemplary embodiment of an apparatus according to the invention.

A first exemplary embodiment of the invention for use in the context of the radio communication system SYS1 of FIG. 1 and addressing the situation elaborated above is illustrated in FIG. 3 together with FIG. 4.

FIG. 4 schematically illustrates a format monitor functional unit 401 connected to a signal quality target generator functional unit 402 representing a first exemplary embodiment of an apparatus according to the invention implemented in the radio network controller RNC1. The format monitor 401 monitors E-TFCs/E-TFCIs and informs the signal quality target generator 402 of any detected changes in transmission format. The signal quality target generator 402 generally performs the outer loop power control function as described above and hence generates a signal quality target 405 for inner loop power control.

FIG. 3 illustrates a first exemplary method according to the invention for controlling updating of a signal quality target for power control of an ongoing radio transmission in a radio communication system.

At step 301, a check is made whether the transmission format of an on going 3GPP Enhanced Uplink transmission has changed from a first transmission format to a second transmission format. This step is performed by the format monitor 401 illustrated in FIG. 4 based on E-TFCI values received by the radio network controller RNC1 from radio base stations involved in ongoing Enhanced Uplink transmissions. Thus, for the scenario illustrated in FIG. 1 where the E-DCH transport channel 101 has been established between the mobile station MS1 and the first radio base station RBS1, the first radio base station RBS1 decodes E-TFCI values transmitted on the E-DPCCH channel 103 and reports the decoded E-TFCI values to the radio network controller RNC1 using the Iub user plane protocol for DCH data streams. In this exemplary embodiment of the invention, the UL DATA FRAME signals conveying E-DCH transport blocks over the Iub interface are modified to include also E-TFCI values. Alternatively, the radio network controller RNC1 could derive the E-TFC/E-TFCI used by matching the size of a received MAC-es PDU to the set of possible E-DCH Transmission Format Combinations available for the established E-DCH transport channel 101. This latter alternative would not require any modifications of the Iub user plane protocol.

If a newly received E-TFCI value matches the previously received E-TFCI value (an alternative NO at step 301), no change in transmission format has occurred and the format monitor 401 just waits for the next E-TFCI value to repeat step 301.

If the newly received E-TFCI value differs from the previously received E-TFCI value (an alternative YES at step 301), the format monitor 401 informs the signal quality target generator 402 that there has been a change in transmission format. The format monitor 401 also registers the new E-TFCI value as the most recently received E-TFCI value.

At step 302, the signal quality target generator 402 blocks, for a predefined blocking period after detecting said change in transmission format, any updates causing the signal quality target to increase due to perceived communication quality being below the set target. Thus, if during this predefined blocking period, one or more MAC-es Protocol Data Unit (PDU) are received which according to equation (1) normally would trigger an increase of the signal quality target, i.e. target SIR, no update of the signal quality target is performed. The signal quality target is however still updated according to equation (1) for any MAC-es PDU received during the predefined blocking period which according to equation (1) causes the signal quality target to be decreased.

The length of the blocking period, during which any updates causing the signal quality target to increase due to perceived communication quality being below the set target, can be selected to provide a trade-off between gain in cell throughput/system capacity by lowering the average target SIR and hence the user's contribution to the uplink interference) and decreased user throughput (caused by additional retransmission attempts due to too low target SIR). This trade-off policy, and the associated length of the blocking period, is preferably optimized by system simulations and according to the network operators preferences. Typical values of the blocking period could e.g. be in the order of the signaling delay between the first radio base station RBS1 and the radio network controller RNC1, i.e. the time it takes for the Open Loop Power Control to detect that the first radio base station RBS1 has decoded a transmission that used more transmission attempts than the target, or in the order of the Hybrid ARQ round trip time.

In the first exemplary embodiments of the invention, the processing steps 301-302 illustrated in FIG. 3 and the functional units 401 and 402 are implemented using digital data processing circuitry in the form of one or more conventional programmable processors CP1 in the radio network controller node RNC1.

Apart from the exemplary first embodiment of the invention disclosed above, there are several ways of providing rearrangements, modifications and substitutions of the above disclosed embodiment resulting in additional embodiments of the invention.

Figure 5:
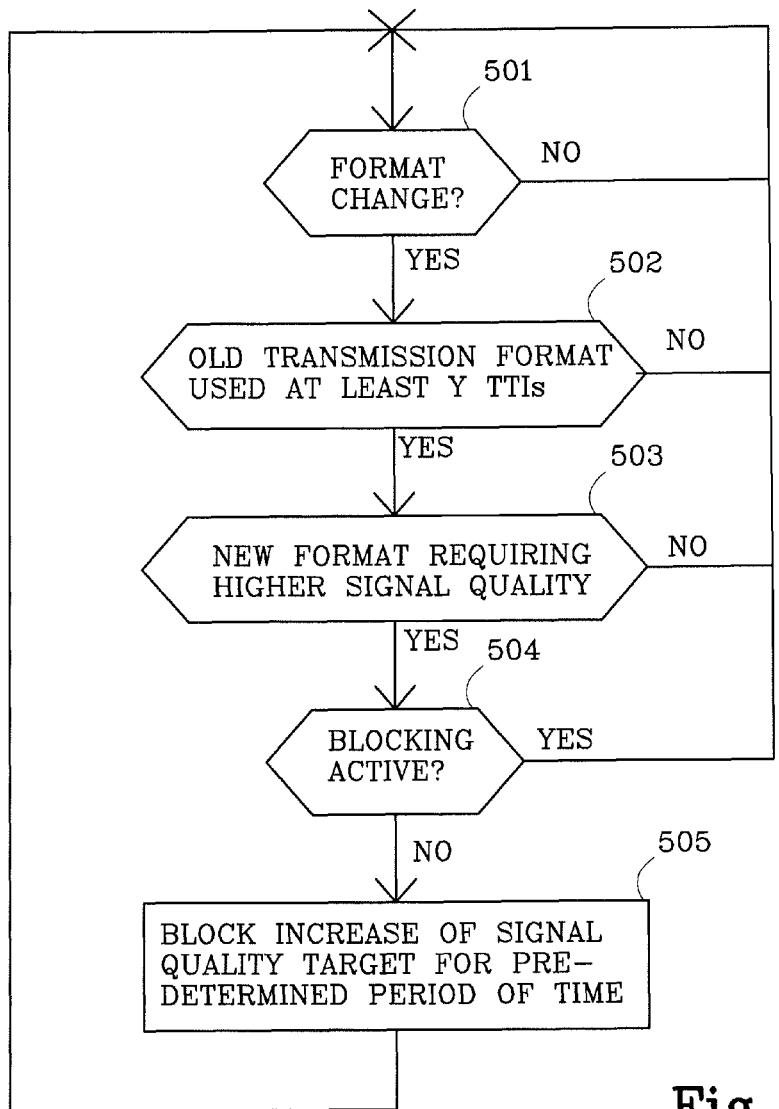
FIG. 5 is a flow diagram illustrating a second exemplary embodiment of a method according to the invention.
Figure 6:
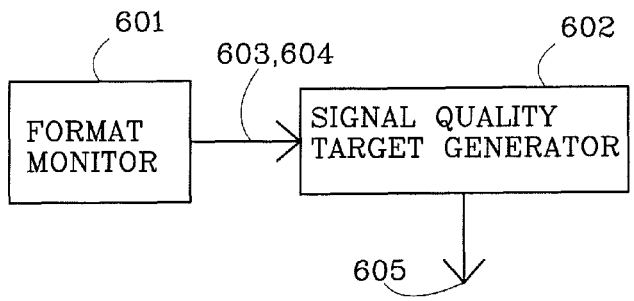
FIG. 6 is a block diagram illustrating a second exemplary embodiment of an apparatus according to the invention.

A second exemplary embodiment of the invention for use in the context of the radio communication system SYS1 of FIG. 1 is illustrated in FIG. 5 together with FIG. 6.

FIG. 6 schematically illustrates a format monitor functional unit 601 connected to a signal quality target generator functional unit 602 representing a second exemplary embodiment of an apparatus according to the invention implemented in the radio network controller RNC1. As in the first exemplary embodiment illustrated in FIG. 4, the format monitor 601 monitors E-TFCs/E-TFCIs and informs the signal quality target generator 602 of changes in transmission format. In this exemplary embodiment, the format monitor 602 internally registers the transmission formats, represented by the associated E-TFCI values, for the last Y TTIs. For WCDMA-like radio communication systems, Y could typically be selected e.g. in the order of 1-10 TTIs. Y should preferably be selected taking service demand and radio environment into account. When the format monitor 401 informs the signal quality target generator 602 of a change in transmission format, it also reports the old and new E-TFCI values respectively (schematically illustrated as 603 and 604 in FIG. 6). The signal quality target generator 602 performs the outer loop power control function as generally described in connection with equation (1) and generates a signal quality target 605 for inner loop power control.

FIG. 5 illustrates a first exemplary method according to the invention for controlling updating of a signal quality target for power control of an ongoing radio transmission in a radio communication system.

At step 501, a check is made whether the transmission format of an on going 3GPP Enhanced Uplink transmission has changed. This step is performed by the format monitor 601 illustrated in FIG. 6 based on E-TFCI values received by the radio network controller RNC1 from radio base stations involved in ongoing Enhanced Uplink transmissions. Thus, for the scenario illustrated FIG. 1 where the E-DCH transport channel 101 has been established between the mobile station MS1 and the first radio base station RBS1, the first radio base station RBS1 decodes E-TFCI values transmitted on the E-DPCCH channel 103 and reports the decoded E-TFCI values to the radio network controller RNC1 using the Iub user plane protocol for DCH data streams. In this exemplary embodiment of the invention, the UL DATA FRAME signals conveying E-DCH transport blocks over the Iub interface are modified to include also E-TFCI values.

Alternatively, the radio network controller RNC1 could derive the E-TFC/E-TFCI used by matching the size of a received MAC-es PDU to the set of possible E-DCH Transmission Format Combinations available for the established E-DCH transport channel 101. This latter alternative would not require any modifications of the Iub user plane protocol.

If a newly received E-TFCI value matches the previously received E-TFCI value (an alternative NO at step 501), the format monitor 601 internally registers that the same/old transmission format has been used in yet another TTI by internally registering the received E-TFCI as the most recently received E-TFCI value and then waits for the next E-TFCI value to repeat step 501.

If the newly received E-TFCI value differs from the previously received E-TFCI value (an alternative YES at step 501), the format monitor 601 checks at step 502 whether prior to receiving the new E-TFCI value, the old transmission format has been used at least for the latest Y TTIs and internally registers the new E-TFCI value as the most recently received E-TFCI value.

If the old transmission format has not been used at least Y TTIs before receiving the new E-TFCI value (an alternative NO at step 502), the format monitor 610 waits for the next E-TFCI value to repeat step 501.

If the old transmission format has been used for at least Y TTIs (an alternative YES at step 502), the format monitor 601 informs the signal quality target generator 602 that there has been a change in transmission format, from a first transmission format associated with the old (or first) E-TFCI value to a second transmission format associated with the new (or second) E-TFCI value, and provides both the old and new E-TFCI values (schematically illustrated as 603 and 604 in FIG. 6) to the signal quality target generator 602.

At step 503, the signal quality target generator 602 considers required signal qualities, i.e. required SIR values in this embodiment, associated with the first and second transmission formats to determine whether the new/second transmission format requires a higher signal quality than the old/first transmission format.

Figure 7:
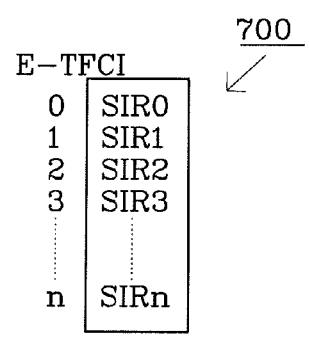
FIG. 7 is a block diagram illustrating an exemplary data structure representing a table of required SIR values for different E-TFCs.

In this exemplary embodiment, the signal quality target generator 602 retrieves estimated required SIR values associated with the new and old transmission formats. The estimated required SIR values are stored in a data structure representing a table 700 schematically illustrated in FIG. 7. The table includes estimated required SIR values SIR0-SIRn associated with respective E-TFCI values 0-n. Thus for each E-TFCI value (e.g. 1) there is an associated estimated required SIR value (e.g. SIR1) indicating the SIR value which is believed to be required to maintain appropriate communication quality when using the E-DCH transport format combination associated with said E-TFCI value. The estimated required SIR values can be determined by analytical or numerical methods, such as system- and link layer simulations, or by having the system gather statistics on what SIR different E-DCH Transport Format Combinations actually require. Gathering statistics on what SIR different E-DCH Transport Format Combinations require may e.g. be performed by forcing absolute grant (or similar bit rate/resource limiting unit) to cause a certain E-DCH Transport Format Combination to be used for a period of time long enough to enable the target SIR from the outer loop power control function to reach a stable/steady-state value (i.e. where the impact on the target SIR from transmission using other E-DCH Transport Format Combinations is negligible) and then collecting target SIR statistics associated with the E-DCH Transport Format Combination after reaching the steady state. From the gathered statistics, the estimated required SIR for a E-DCH Transport Format Combination can be derived e.g. as a mean value.

If the new transmission format does not require a higher signal quality (an alternative NO at step 503), processing returns to step 501 where the format monitor 601 waits for the next E-TFCI value to repeat step 501.

If the new transmission format requires a higher signal quality (an alternative YES at step 503), processing continues at step 504 where the signal quality target generator 602 checks whether blocking is currently active, i.e. whether a new change of transmission format has been detected within an already running blocking period triggered by a previous change in transmission format.

If blocking is active (an alternative YES at step 504), processing returns to step 501 where the format monitor 601 waits for the next E-TFCI value to repeat step 501, i.e. the detected new change of transmission format does not trigger the blocking step 505 to be repeated.

If blocking is not active (an alternative NO at step 504), the signal quality target generator 602 blocks, for a predefined blocking period after detecting said change in transmission format, any updates causing the signal quality target to increase due to communication quality being below the set communication quality target. Thus, if during this predefined blocking period, one or more MAC-es Protocol Data Unit (PDU) are received which according to equation (1) normally would trigger an increase of the signal quality target, i.e. target SIR, no update of the signal quality target is performed. The signal quality target is however still updated according to equation (1) for any MAC-es PDU received during the predefined blocking period which according to equation (1) causes the signal quality target to be decreased.

In the second exemplary embodiment, the blocking step is selectively applied when certain conditions are fulfilled. In this exemplary embodiment, in order to trigger blocking of signal quality target increases for the predefined blocking period, the old/first transmission format must have been used at least for a predetermined period of time (in this embodiment Y TTIs), the new/second transmission format must require a higher signal quality than the old/first transmission format, and the detected change in transmission format must not have occurred while there is an active blocking period, i.e. if a new change of transmission format is detected within an already running blocking period, the detected new change in transmission format does not trigger the blocking step 505 to be performed.

As demonstrated by the first and second exemplary embodiments disclosed above, in different embodiments of the invention the blocking step may either be performed regardless of any differences between required signal qualities for a current/first and a new/second transmission formats or alternatively the blocking step may be selectively applied depending on differences in said required signal qualities. As an alternative to applying the blocking step only when the second transmission format requires a higher signal quality than the first transmission format, alternative embodiments of the invention may apply said blocking step only when the second transmission format requires a signal quality which is at least a predefined margin higher than the signal quality required by the first transmission format.

Further, as demonstrated by the second exemplary embodiment, the blocking step may be selectively applied depending on the pattern of transmission formats recently applied for the radio transmission. Thus the blocking step could e.g. be selectively applied if at least one of the following conditions are fulfilled:

the first transmission format has been used at least for a predefined period of time;

the first transmission format has been used in at least a predefined percentage of time in a predefined period of time.

the number of instances where said blocking step has been applied during a predefined period of time is less than a predefined number.

As demonstrated in the second embodiment, if a new change of transmission format is detected within a blocking period triggered by a previous change in transmission format, the detected new change of transmission format should preferably not trigger the blocking step to be repeated.

Instead of performing the outer loop power control function in the radio network controller RNC1, it can be performed in the respective radio base station RBS1. In exemplary embodiments according to this alternative, processing may be performed e.g. essentially as in the exemplary first or second embodiments (but in the radio base station instead of the radio network controller) using functional units as illustrated in FIGS. 4 and 6.

It is of course possible to use other forms of signal quality targets than SIR. Other examples include e.g. Signal to Interference and Noise Ratio (SINR), Eb/No (bit energy over noise), Ec/No (chip energy over noise). Further, please note that apart from equation (1), representing an example of a so called attack-decay filter, there are many alternative ways known in the art of how to adjust signal quality targets based on perceived communication quality, both in terms of what measure of communication quality to use (e.g. number of transmission attempts for HARQ process, Block Error Rate BLER, Delay) and the way communication quality is accounted for in signal quality targets e.g. using a Simple moving average filter (SMA), Double moving average filter (DMA), Simple exponential smoothing filter (SES), Double exponential smoothing filter (DES) or a Nonlinear exponential smoothing filter (NLES). From the perspective of the present invention, the way perceived communication quality is accounted for in a signal quality target is not important and different embodiments may use different ways of accounting for communication quality.

Figure 8:
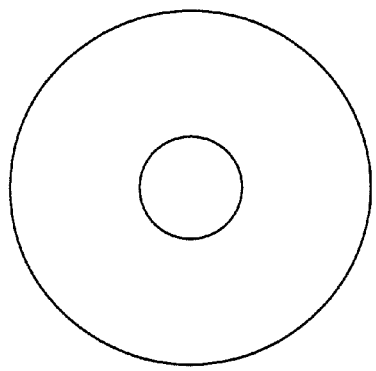
FIG. 8 shows an example of a computer-readable medium

The different embodiments of methods and apparatuses according to the invention disclosed above may all be implemented the same way as for the first exemplary embodiment, i.e. utilizing digital data processing circuitry in the form of one or more conventional programmable processors to perform the different processing steps of the methods. However, any digital data processing circuitry capable of performing said processing could be used, e.g. an ASIC, a discrete logic circuit etc. In the first exemplary embodiment of the invention, as in other embodiments of the invention using programmable devices, the controlling computer program (software) is embodied as machine-readable instructions stored on some kind of computer-readable medium such as RAM, a hard drive, electronic read-only memory, an optical storage device (e.g. a CD-ROM as schematically illustrated in FIG. 8) etc. Programmable devices performing processing according to the invention, can be dedicated to this task or used also for processing relating to other tasks.

Even though the invention in the exemplary embodiments disclosed above has been applied in the context of Enhanced Uplink of a UMTS radio communication system, the invention is also generally applicable in other contexts, both for transmissions in the uplink direction, i.e. for transmissions from mobile stations, as well as downlink direction, i.e. for transmissions to mobile stations, in UMTS radio communication systems or in other radio communication systems where radio transmissions are subject to power control utilizing signal quality targets which may updated according to communication quality and where transmission formats of an ongoing radio transmission may change over time.

The invention claimed is:

1. A method of controlling updating of a signal quality target for power control of an ongoing radio transmission in a radio communication system (SYS1), wherein said signal quality target is updated based on communication quality so that the signal quality target is increased when encountering events indicating that the communication quality is below a communication quality target and the signal quality target is reduced when encountering events indicating that the perceived communication quality is above the communication quality target, said method comprising:
   detecting a change in transmission format from a first transmission format to a second transmission format for the radio transmission; and
   blocking, for a predefined blocking period after detecting said change in transmission format, any updates causing the signal quality target to increase due to communication quality being below the communication quality target,
   wherein said blocking step is selectively applied when at least one of the following conditions are fulfilled:
      the first transmission format has been used at least for a predefined period of time;
      the first transmission format has been used in at least a predefined percentage of time in a predefined period of time; and
      the number of instances where said blocking step has been applied during a predefined period of time is less than a predefined number.

2. A method according claim 1, wherein the method includes a step of considering required signal qualities associated with the first and second transmission formats and the blocking step is selectively applied depending on differences in said required signal qualities.

3. A method according to claim 2, wherein said blocking step is applied only when the second transmission format requires a higher signal quality than the first transmission format.

4. A method according to claim 2, wherein said blocking step is applied only when the second transmission format requires a signal quality which is at least a predefined margin higher than the signal quality required by the first transmission format.

5. A method according to claim 1, wherein the blocking step is performed regardless of any differences between required signal qualities for the first and second transmission formats respectively.

6. A method according to claim 1, wherein said blocking step is selectively applied depending on the pattern of transmission formats recently applied for the radio transmission.

7. A method according to claim 1, wherein when a new change of transmission format is detected within said blocking period, the detected new change of transmission format does not trigger said blocking step to be repeated.

8. A method according to claim 1, wherein the radio transmission is an uplink radio transmission.

9. A method according to claim 8, wherein the uplink radio transmission is an Enhanced Uplink transmission.

10. A method of controlling updating of a signal quality target for power control of an ongoing radio transmission in a radio communication system (SYS1), wherein said signal quality target is updated based on communication quality so that the signal quality target is increased when encountering events indicating that the communication quality is below a communication quality target and the signal quality target is reduced when encountering events indicating that the perceived communication quality is above the communication quality target, said method comprising:
   detecting a change in transmission format from a first transmission format to a second transmission format for the radio transmission; and blocking, for a predefined blocking period after detecting said change in transmission format, any updates causing the signal quality target to increase due to communication quality being below the communication quality target, wherein the radio transmission is an uplink radio transmission, the uplink radio transmission being a Enhanced Uplink transmission, and wherein said detecting step includes detecting a change from a first E-TFCI value to a second E-TFCI value and the first E-TFCI value is associated with the first transmission format and the second E-TFCI value is associated with the second transmission format.

11. An apparatus (RBS1, RNC1) adapted to control updating of a signal quality target for power control of a radio transmission in a radio communication system (SYS1), wherein the apparatus is adapted to update said signal quality target based on communication quality so that the signal quality target is increased when encountering events indicating that the communication quality is below a communication quality target and the signal quality target is reduced when encountering events indicating that the communication quality is above the communication quality target, said apparatus comprising:

detecting means for detecting a change in transmission format from a first transmission format to a second transmission format for the radio transmission; and blocking means for blocking, for a predefined blocking period after detecting said change in transmission format, any updates causing the signal quality target to increase due to communication quality being below the communication quality target, wherein said blocking is selectively applied when at least one of the following conditions are fulfilled:

the first transmission format has been used at least for a predefined period of time;

the first transmission format has been used in at least a predefined percentage of time in a redefined period of time; and the number of instances where said blocking has been applied during a predefined period of time is less than a predefined number.

12. An apparatus according claim 11, wherein the apparatus includes means for considering required signal qualities associated with the first and second transmission formats and said blocking is selectively applied depending on differences in said required signal qualities.

13. An apparatus according to claim 12, wherein said blocking is applied only when the second transmission format requires a higher signal quality than the first transmission format.

14. An apparatus according to claim 12, wherein said blocking is applied only when the second transmission format requires a signal quality which is at least a predefined margin higher than the signal quality required by the first transmission format.

15. An apparatus according to claim 11, wherein said blocking is performed regardless of any differences between required signal qualities for the first and second transmission formats respectively.

16. An apparatus according to claim 11, wherein said blocking is selectively applied depending on the pattern of transmission formats recently applied for the radio transmission.

17. An apparatus according to claim 11, wherein when a new change of transmission format is detected by said detecting means within said first predefined period of time, the detected new change of transmission format does not trigger said blocking means to repeat said blocking.

18. A computer program embodied on a non-transitory computer-readable medium and executable by digital data processing circuitry to perform a method according to claim 1.

* * * * *

UNITED STATES PATENT AND TRADEMARK OFFICE
CERTIFICATE OF CORRECTION

PATENT NO. : 8,611,943 B2
APPLICATION NO. : 12/741627
DATED : December 17, 2013
INVENTOR(S) : Larsson et al.

It is certified that error appears in the above-identified patent and that said Letters Patent is hereby corrected as shown below:

On the Title Page

Item (75), under "Inventors", in Column 1, Line 1, delete "Lulea" and insert -- Luleå --, therefor.

Item (75), under "Inventors", in Column 1, Line 2, delete "Lulea" and insert -- Luleå --, therefor.

In the Specification

In Column 3, Line 7, delete "to the the" and insert -- to the --, therefor.

In Column 3, Line 7, delete "network RAM" and insert -- network RAN1 --, therefor.

In Column 3, Line 25, delete "FIG. 1" and insert -- FIG. 1. --, therefor.

In Column 4, Line 18, delete "Packet)," and insert -- Packet Access), --, therefor.

In Column 4, Line 24, delete "by a" and insert -- by an --, therefor.

In Column 8, Line 28, delete "monitor 602" and insert -- monitor 601 --, therefor.

In Column 9, Line 61, delete "for a" and insert -- for an --, therefor.

In Column 10, Line 62, delete "time;" and insert -- time. --, therefor.

In the Claims

In Column 13, Line 7, in Claim 10, delete "a Enhanced" and insert -- an Enhanced --, therefor.

Signed and Sealed this
Fifteenth Day of July, 2014

Michelle K. Lee
*Deputy Director of the United States Patent and Trademark Office*

CERTIFICATE OF CORRECTION (continued)
U.S. Pat. No. 8,611,943 B2

In Column 14, Line 2, in Claim 11, delete "redefined period" and insert -- predefined period --, therefor.

In Column 14, Line 7, in Claim 12, delete "according" and insert -- according to --, therefor.